US012500404B2

(12) United States Patent
Robertson et al.

(10) Patent No.: US 12,500,404 B2
(45) Date of Patent: Dec. 16, 2025

(54) MODULAR INSTRUMENT COMPARTMENT

(71) Applicant: Schneider Electric USA, Inc., Andover, MA (US)

(72) Inventors: Denise Robertson, Murfreesboro, TN (US); James Raymond Ramsey, Murfreesboro, TN (US); Ricardo Reyes Reyes, Monterrey (MX); Pankaj Lal, Brentwood, TN (US); Mayela Lizeth Sánchez Valdés, Monterrey (MX)

(73) Assignee: Schneider Electric USA, Inc., Boston, MA (US)

( * ) Notice: Subject to any disclaimer, the term of this patent is extended or adjusted under 35 U.S.C. 154(b) by 218 days.

(21) Appl. No.: 18/017,295

(22) PCT Filed: Jul. 23, 2021

(86) PCT No.: PCT/US2021/043036
§ 371 (c)(1),
(2) Date: Jan. 20, 2023

(87) PCT Pub. No.: WO2022/020757
PCT Pub. Date: Jan. 27, 2022

(65) Prior Publication Data
US 2023/0275406 A1    Aug. 31, 2023

(51) Int. Cl.
*H02G 5/00* (2006.01)
*H02B 1/01* (2006.01)
(Continued)

(52) U.S. Cl.
CPC ............. *H02G 5/007* (2013.01); *H02B 1/012* (2013.01); *H02B 1/04* (2013.01); *H02B 1/056* (2013.01);
(Continued)

(58) Field of Classification Search
CPC ............ H02G 5/007; H02G 5/06; H02G 5/02; H02G 3/08; H02G 3/81; H02B 1/012;
(Continued)

(56) References Cited

U.S. PATENT DOCUMENTS 5,001,602 A    3/1991  Suffi et al.
6,127,627 A *  10/2000 Daoud ................... H04Q 1/021
                                                    312/109
(Continued)

FOREIGN PATENT DOCUMENTS

EP    2352619 B1    4/2016
FR    2791515 B1    4/2001
KR   101286577 B1   7/2013

OTHER PUBLICATIONS

Extended European Search Report dated Jul. 19, 2024 for corresponding European Patent Application No. 21847158.9 -1201, 9 pages.
(Continued)

Primary Examiner — Angel R Estrada
(74) Attorney, Agent, or Firm — Kinney & Lange, P.A.

(57) ABSTRACT

An instrument compartment for an electrical cabinet includes a box-shaped compartment structure comprising a stationary end portion mounted on a frame of an electrical cabinet and a swingable portion hinge-mounted to the stationary end portion. A power supply terminal is mounted to an inside surface of the stationary end portion, configured to supply electrical power to electrical components in the interior space of the compartment structure. Guide structures are mounted on an inside back panel of the interior space within the compartment structure, configured to position the electrical components for connection to wiring harnesses and the power supply terminal or other electrical compo-
(Continued)

nents to facilitate assembly of the electrical components within the interior space of the compartment structure.

20 Claims, 17 Drawing Sheets

(51) Int. Cl.
*H02B 1/04* (2006.01)
*H02B 1/056* (2006.01)
*H02B 1/20* (2006.01)
*H02B 1/30* (2006.01)
*H02B 1/32* (2006.01)
*H02B 1/36* (2006.01)
*H02B 3/00* (2006.01)
*H02G 5/06* (2006.01)

(52) U.S. Cl.
CPC .............. *H02B 1/20* (2013.01); *H02B 1/306* (2013.01); *H02B 1/32* (2013.01); *H02B 1/36* (2013.01); *H02B 3/00* (2013.01); *H02G 5/06* (2013.01)

(58) Field of Classification Search
CPC . H02B 1/04; H02B 1/056; H02B 1/20; H02B 1/306; H02B 1/32; H02B 1/308; H02B 3/00; H02B 1/34; H02B 1/38; H02B 1/46; H02B 1/48; H02B 11/12; H05K 7/14; H05K 7/1417; H05K 7/1422
USPC ...... 174/60, 52, 535, 520, 559, 50; 361/600, 361/601, 614, 627, 641; 220/3.2, 3.8, 220/4.02

See application file for complete search history.

(56) References Cited

U.S. PATENT DOCUMENTS

| | | | |
|---|---|---|---|
| 7,239,521 | B2 | 7/2007 | Quero et al. |
| 7,277,273 | B2* | 10/2007 | Smith .................. H05K 7/1488 |
| | | | 361/679.01 |
| 7,816,602 | B2* | 10/2010 | Landry .............. G02B 6/44765 |
| | | | 220/4.02 |
| 8,733,855 | B2 | 5/2014 | Josten et al. |
| 8,952,252 | B2 | 2/2015 | Bugaris et al. |
| 9,007,746 | B2* | 4/2015 | Rajvanshi .............. H02B 1/565 |
| | | | 361/678 |
| 9,337,596 | B2* | 5/2016 | El Zakhem ............ H01R 43/00 |
| 10,218,158 | B1 | 2/2019 | Wiant et al. |
| 10,250,022 | B2* | 4/2019 | Pappas ................... H02G 3/081 |
| 2006/0067018 | A1 | 3/2006 | Malkowski, Jr. et al. |
| 2007/0111575 | A1 | 5/2007 | Jensen et al. |

OTHER PUBLICATIONS

International Search Report and Written Opinion mailed Oct. 29, 2021 in corresponding International Application No. PCT/US2021/043036, 23 pages.

* cited by examiner

SEC. X-X' OF FIG. 5B

MODULAR INSTRUMENT COMPARTMENT

TECHNICAL FIELD

This invention is generally related to electrical cabinets, and is more particularly directed to an instrument compartment of an electrical cabinet, which provides fast, easy, error free installation of components in the instrument cabinet by lower skilled labor, without electrical wiring or testing knowledge.

BACKGROUND

A conventional switchboard instrument compartment is a stationary box with a hinged door, including instrument components hand-wired to generic mounting pans. This practice is labor intensive, requires skilled labor, and delays shipment of equipment. The hand-wiring is prone to human error that is exponentially more difficult to trouble shoot and repair as the number of elements or features are added.

What is needed, therefore, is an instrument compartment of an electrical cabinet, which will provide fast, easy, error free installation of components in the instrument cabinet by lower skilled labor, without electrical testing.

SUMMARY

An instrument compartment for an electrical cabinet includes a box-shaped compartment structure comprising a stationary end portion mounted on a frame of an electrical cabinet and a swingable portion hinge-mounted to the stationary end portion. A power supply terminal block is mounted to an inside surface of the stationary end portion, configured to supply electrical three-phase power, neutral, and ground to modular electrical components in the interior space of the compartment structure. Guide structures are mounted on an inside back panel of the interior space within the compartment structure, configured to position the modular electrical components for connection to wiring harnesses and the power supply terminal to facilitate assembly of the modular electrical components within the interior space of the compartment structure.

The modular electrical components are prewired with plug-and-play wiring harnesses and are assembled onto mounting pan platforms that are mounted into place on shoulder-rivets and screws to fix their final location. The swingable portion of the compartment structure allows access to an interior volume of the electrical cabinet located behind the swingable portion of the compartment structure, for installation and maintenance of electrical equipment such as electrical power cables, for inspection of electrical connections, and for installation of additional components.

In accordance with one example embodiment described herein, an instrument compartment for an electrical cabinet, comprises:
  a box-shaped compartment structure comprising a stationary end portion mounted on a frame of an electrical cabinet, and a swingable portion hinge-mounted to the stationary end portion, box-shaped compartment structure having an open front-side facing a front side of the electrical cabinet, the swingable portion configured to swing out from the front side of the electrical cabinet to enable access through the front side of the electrical cabinet to an interior volume of the electrical cabinet located behind the swingable portion of the compartment structure; and
  guide structures mounted on an inside back panel of the interior space within the compartment structure, configured to position at least one modular electrical component for connection by at least one wiring harness to another modular electrical component during assembly within the interior space of the compartment structure.

In accordance with one example embodiment described herein, the instrument compartment for an electrical cabinet, further comprises:
  a door hinge-mounted to the stationary end portion of the compartment structure and covering the open front-side, configured to swing away from the open front-side to enable access through the open front-side to an interior space within the compartment structure; and
  a power supply terminal mounted to an inside surface of the stationary end portion of the compartment structure, configured to supply electrical power to at least one modular electrical component in the interior space of the compartment structure.

In accordance with one example embodiment described herein, the instrument compartment for an electrical cabinet, further comprises:
  wherein the guide structures include a plurality of rivet structures mounted in a pattern on the inside back panel of the interior space within the compartment structure, each rivet structure of the plurality of rivet structures projecting out of the inside back panel of the interior space;
  at least one pan platform configured to support the at least one modular electrical component, the at least one pan platform including a plurality of holes or slots through the pan platform in a pattern matching at least a portion of the pattern of rivet structures mounted on the inside back panel of the interior space;
  wherein at least one hole or slot of the plurality of holes or slots through the pan platform is configured to fit over a corresponding one of the plurality of rivet structures mounted on the inside back panel of the interior space; and
  wherein the corresponding one of the plurality of rivet structures is located on the inside back panel of the interior space to position the at least one modular electrical component mounted on the at least one pan platform to connect to the at least one wiring harness to connect to the power supply terminal or other modular electrical component during assembly within the interior space of the compartment structure.

In accordance with one example embodiment described herein, the instrument compartment for an electrical cabinet, further comprises:
  wherein during an assembly operation, the swingable portion of the compartment structure is swung away from the front side of the electrical cabinet to allow access through the front side of the electrical cabinet, to enable an assembler to reach into the interior volume located behind the swingable portion, for connection of a wiring harness to electrical components in the interior volume.

The resulting apparatus provides an instrument compartment of an electrical cabinet, which will provide fast, easy, error free installation of components in the instrument cabinet by lower skilled labor, without electrical testing.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

DETAILED DESCRIPTION

Figure 1:
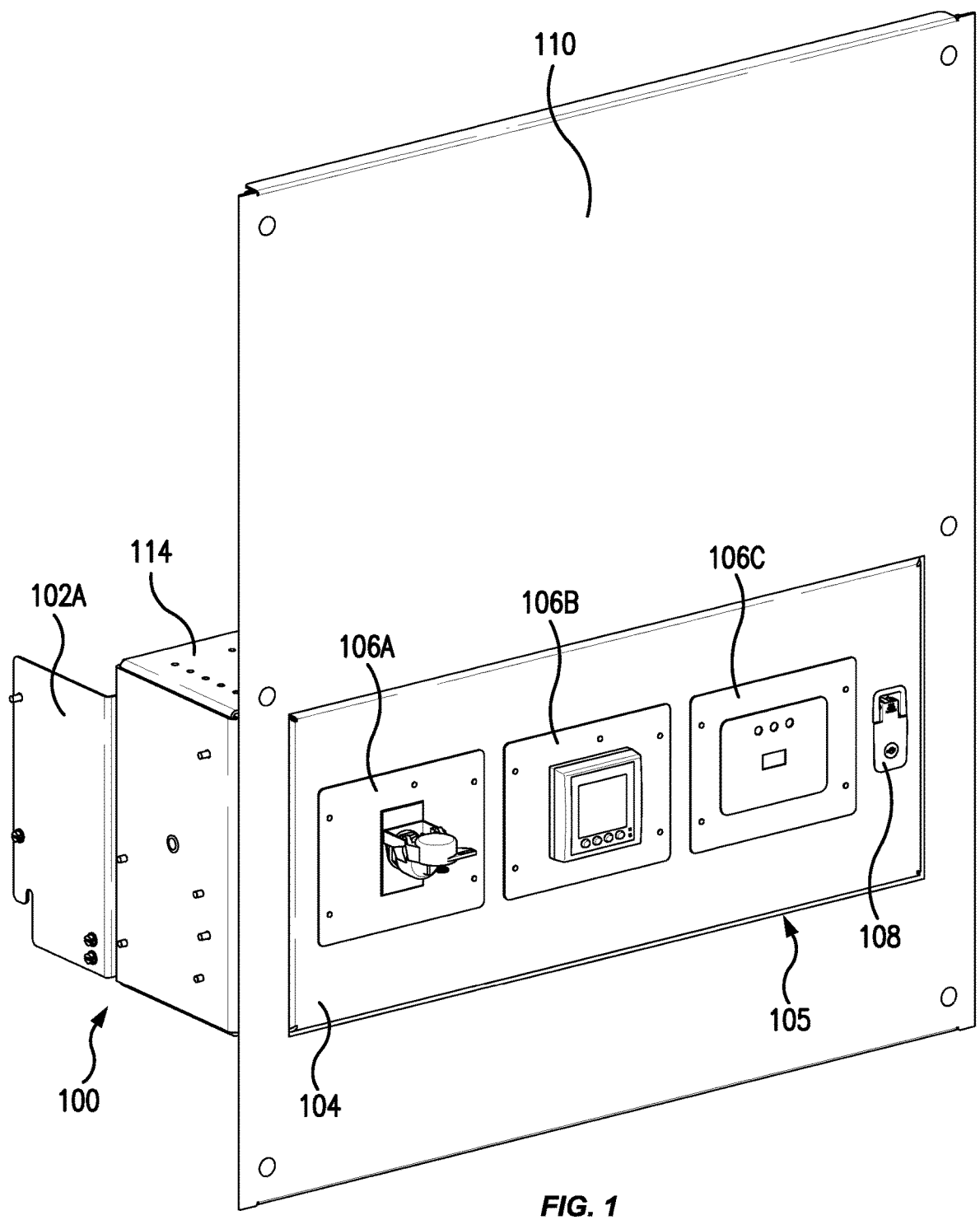
FIG. 1 is an front, left perspective view the front of the modular instrument compartment with its front door closed, according to an example embodiment of the disclosure.
Figure 3A:
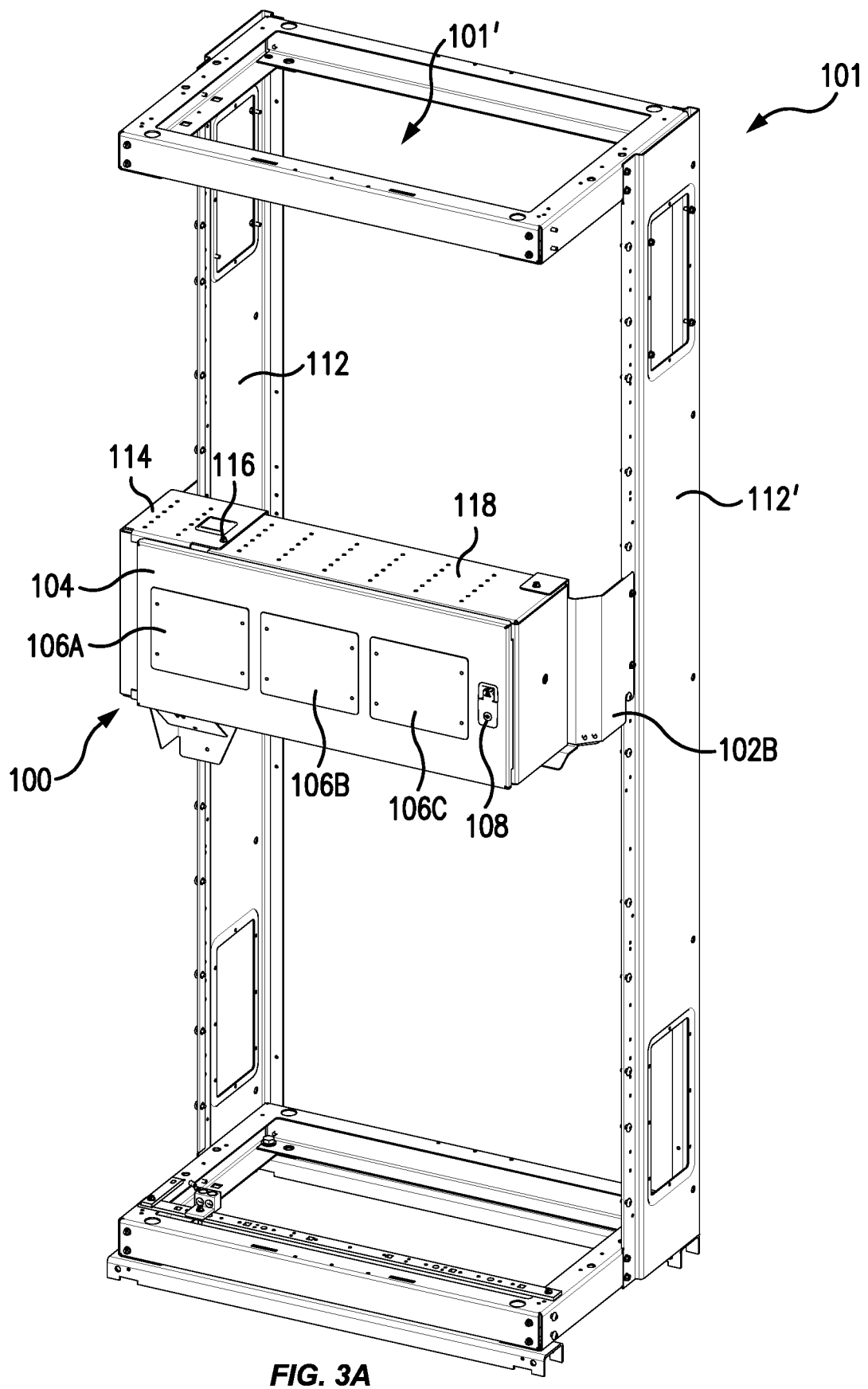
FIG. 3A is a front, right perspective view of the modular instrument compartment with the stationary end portion mounted on the frame of the electrical cabinet, and the swingable portion hinge-mounted to the stationary end portion, according to an example embodiment of the disclosure.

FIG. 1 is an front, left perspective view the front of the modular instrument compartment 100, or switchboard instrument compartment, with its front door 104 closed covering the opening 105 in the front surface 110 of the electrical cabinet 101 (FIG. 3A). The modular instrument compartment 100 provides fast, easy, and error free installation of modular electrical components in the instrument cabinet by lower skilled labor, without electrical wiring or testing knowledge. Example modular electrical components may include a power or energy meter, arc energy reduction device, power controls device, communications device, automation and controls device, surge protection device, wiring over-heating protection device, a gateway device or an absence of voltage tester device. Example modular electrical components may also include a power meter for monitoring of branch or main circuits, a maintenance mode switch, or a 24 VDC terminal for control power. The modular electrical components are prewired and pretested with plug-and-play wiring harnesses to allow error free installation without electrical terminal to terminal wiring or testing. The modular electrical components are assembled onto mounting pan platforms (FIGS. 5B, and 5D) that are mounted into place on shoulder-rivets 125 and screws 127 to fix their final location. The swingable portion of the compartment structure allows access to an interior volume of the electrical cabinet located behind the swingable portion of the compartment structure, for installation and maintenance of electrical equipment such as electrical power cables, for inspection of electrical connections, and for installation of additional components. Examples of the modular electrical component include a power meter, a maintenance mode Switch, 24 VDC power control, a surge protection devices, a wireless metering device, a wiring over-heating protection device, a gateway, or an absence of voltage tester. This modular system allows for future expansion to other systems that may be added as requirements evolve.

Figure 2A:
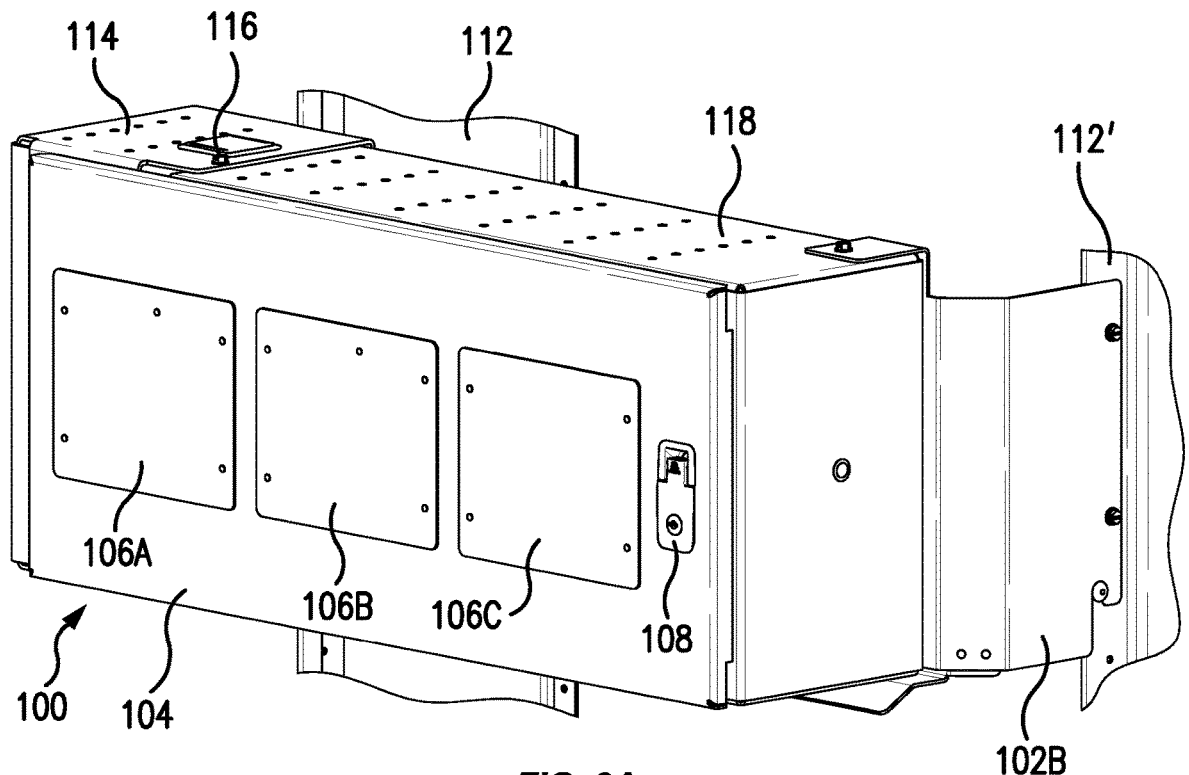
FIG. 2A is a front, right perspective view of the modular instrument compartment with its front door closed, showing the modular instrument compartment as a box-shaped compartment structure comprising a stationary end portion mounted on the frame of the electrical cabinet, and a swingable portion hinge-mounted to the stationary end portion, according to an example embodiment of the disclosure.
Figure 3B:
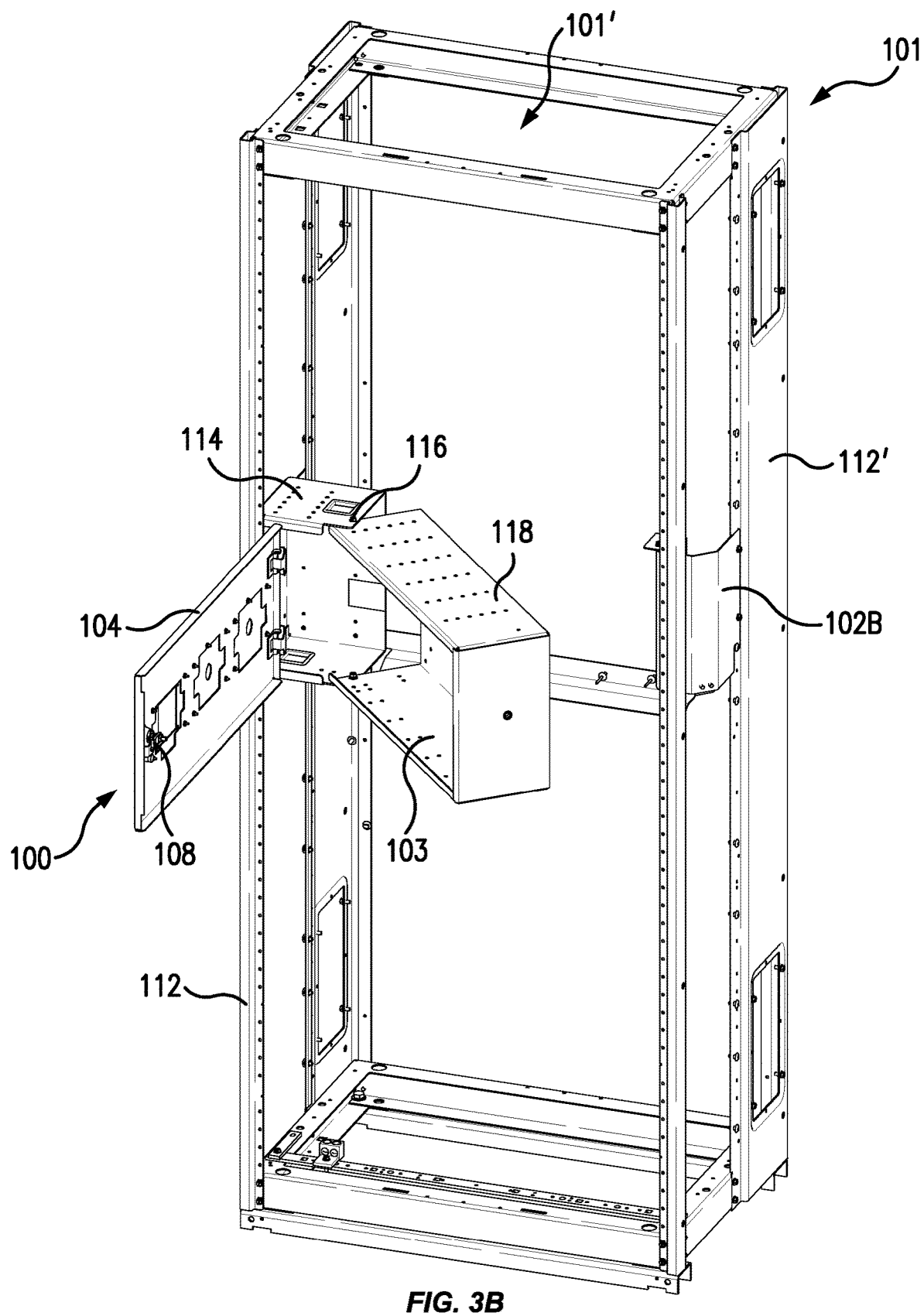
FIG. 3B is a front, right perspective view of the modular instrument compartment with the door open and the swingable portion configured to swing out from the electrical cabinet to enable access to an interior volume of the electrical cabinet located behind the swingable portion of the compartment structure, according to an example embodiment of the disclosure.

The box-shaped compartment structure 100 (FIG. 2A) comprises a stationary end portion 114 mounted 102A on the left side of the frame 112 of the electrical cabinet 101 (FIG. 3A). The stationary end portion 114 is mounted to the electrical cabinet 101 on shoulder rivets to hook into a specific location on the frame 112 and swing into a final position that is fastened with screws. FIGS. 1 and 2A show details of the shoulder rivets for the hook and swing attachment to the frame 112. The box-shaped compartment structure 100 (FIG. 2A) further comprises a swingable portion 118 hinge-mounted on a pivot 116 to the stationary end portion 114. The box-shaped compartment structure 100 has an open front-side 103 (FIG. 3B) facing the opening 105 in the trim front surface 110 of the electrical cabinet 101. The swingable portion 118 is configured to swing out from the electrical cabinet 101 (FIG. 3B) to enable access to an interior volume 101' of the electrical cabinet 101 located behind the swingable portion 118 of the compartment structure 100. The swingable portion 118 will swing away from the electrical cabinet 101 when the trim front 110 is removed. The door 104 will swing out with trim front 110 in place. When the swingable portion 118 of the compartment structure 100 is in its closed position (FIG. 2A), it is positioned and supported by a bracket 102B mounted on the right side of the frame 112' of the electrical cabinet 101.

Figure 2B:
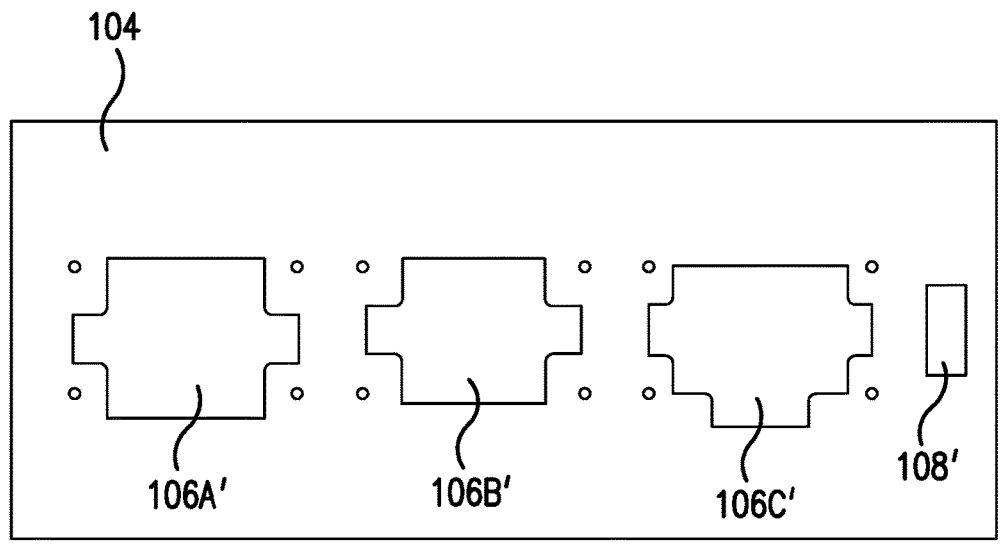
FIG. 2B is a front view of the front panel of the modular instrument compartment, illustrating the location of through-hole patterns for switches or displays, to be covered by cover-plates if not used, according to an example embodiment of the disclosure.
Figure 4A:
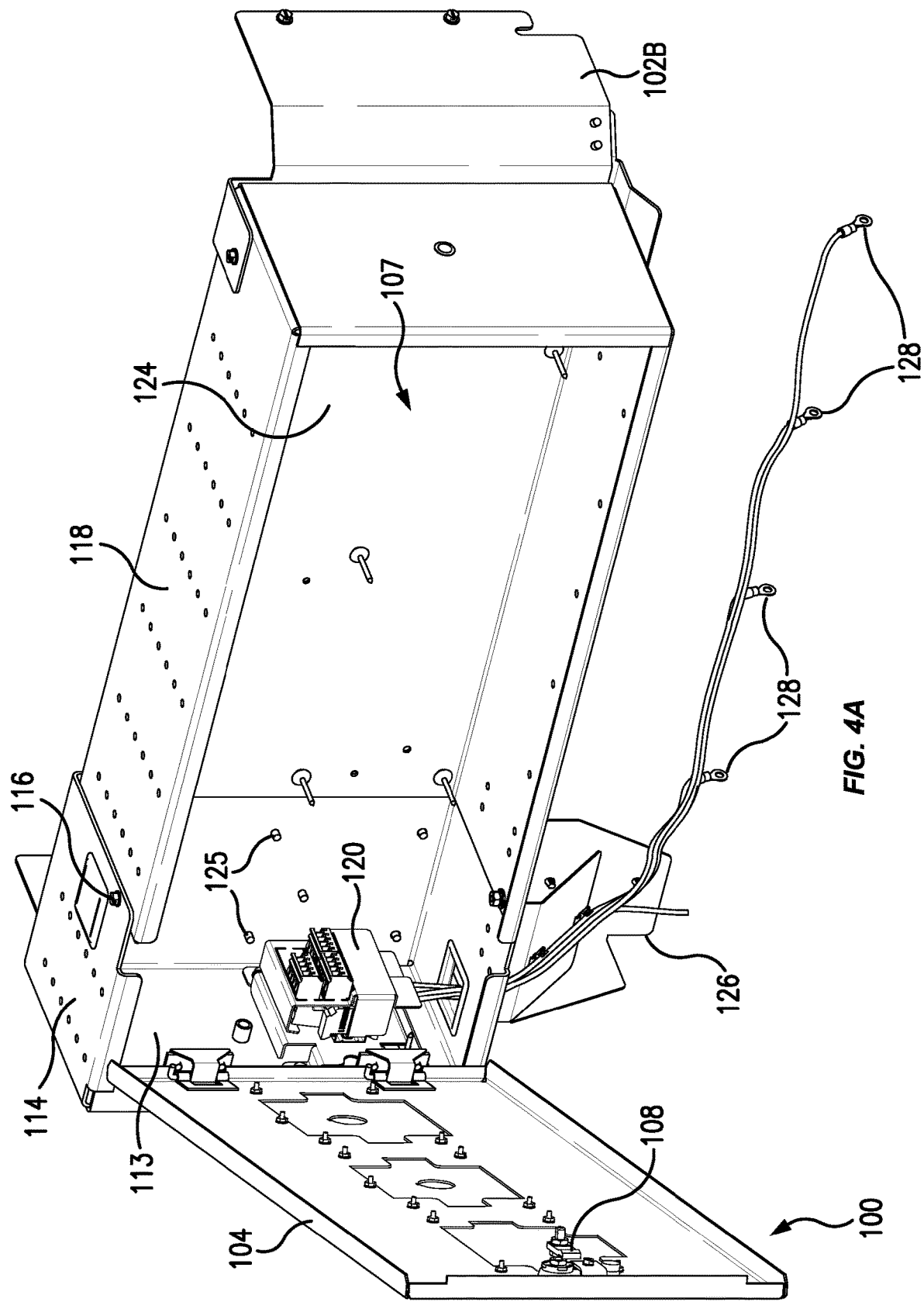
FIG. 4A is a front, right perspective view of the modular instrument compartment with the door open, showing the interior space of the compartment and the power supply terminal or power terminal block mounted to an inside surface of the stationary end portion of the compartment structure, configured to supply electrical power to electrical components in the interior space of the compartment structure, according to an example embodiment of the disclosure.

The door 104 is hinge-mounted to the stationary end portion 114 of the compartment structure 100 and covers the open front side of the compartment structure 100. The door 104 is configured to swing away from the opening 105 (FIG. 3B) to enable access through the opening 105 to the interior space 107 (FIG. 4A) within the compartment structure 100. The door 104 may include cover plates 106A, 106B, and 106C (FIG. 1) for user interface devices, such as switches and displays. The cover plates cover hole patterns 106A', 106B', and 106C' in the door 104 (FIG. 2B), to allow insertion of display/switch mounting plates to slide through door cutouts without requiring the cables to be disconnected during installation. Displays/Switch are preinstalled on the plates when customer receives the kits. A latch 108 secures the door 104 in its closed position (FIG. 3A).

Figure 4B:
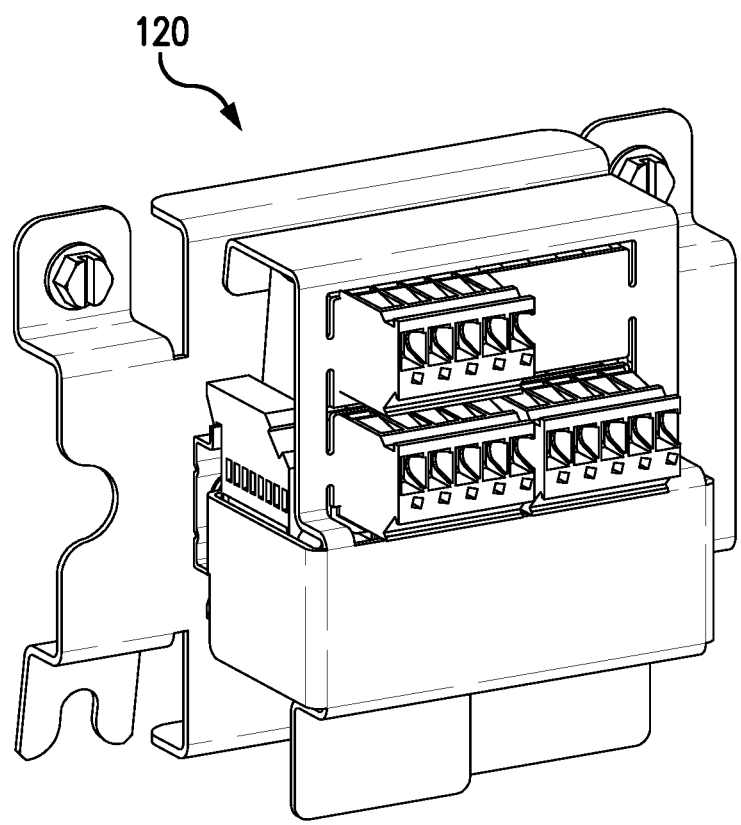
FIG. 4B is an front, left perspective view of the power supply terminal, according to an example embodiment of the disclosure.

A power supply terminal 120 or power terminal block (FIGS. 4A and 4B) is mounted to an inside side panel 113 of the stationary end portion 114 of the compartment structure 100. The power supply terminal 120 is configured to supply electrical power to at least one modular electrical component (FIG. 5E) in the interior space 107 of the compartment structure 100. The power supply terminal 120 provides A, B, and C phase plus neutral and ground with the maximum wire gauge required for all applications. A wiring harness 128 is prewired to the power supply terminal 120 to connect to a power source. The wiring harness 128 is shown passing through a wire routing bracket 126 mounted beneath the compartment structure 100. The wire routing bracket 126 is composed to two portions. One portion is utilized to route potentially noisy power supply wiring. The second portion is utilized to route sensitive control or sensing circuitry. The power supply terminal 120 may be connected to other modular electrical components 130, 132, 134, 136, 138, and/or 140 in the instrument cabinet 100 (FIG. 5E) during assembly within the interior space of compartment structure 100.

Guide structures 125 (FIG. 4A) mounted on an inside back panel 124 of the interior space 107 within the compartment structure 100, are configured to position the modular electrical components for connection by plug and play wiring harnesses to the power supply terminal 120 or other modular electrical component during assembly within the interior space 107 of the compartment structure 100. The guide structures 125 may be a plurality of rivet structures 125 (FIGS. 5A, 5B, 5C, 5D, and 5F) mounted in a pattern on the inside back panel 124 of the interior space 107 within the compartment structure 100. Each rivet structure 125 projects out of the inside back panel 124 of the interior space 107 and may be a shoulder-rivet or a similar structure.

Figure 5A:
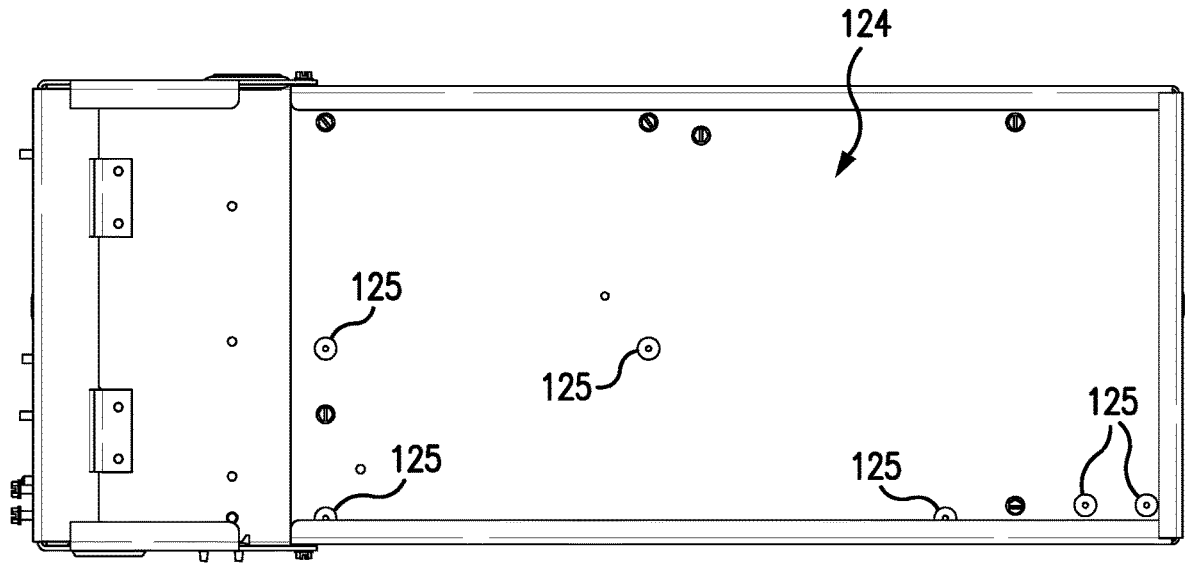
FIG. 5A is a front view of the back panel in the interior space of the modular instrument compartment, showing an example layout of the shoulder-rivets mounted in the back panel, which position mounting pan platforms that are mounted into place on the shoulder-rivets, according to an example embodiment of the disclosure.

FIG. 5A is a front view of the back panel 124 in the interior space 107 of the modular instrument compartment 100, showing an example layout of the shoulder-rivets 125 mounted in the back panel, which position mounting pan platforms that are mounted into place on the shoulder-rivets, according to an example embodiment of the disclosure.

Figure 5B:
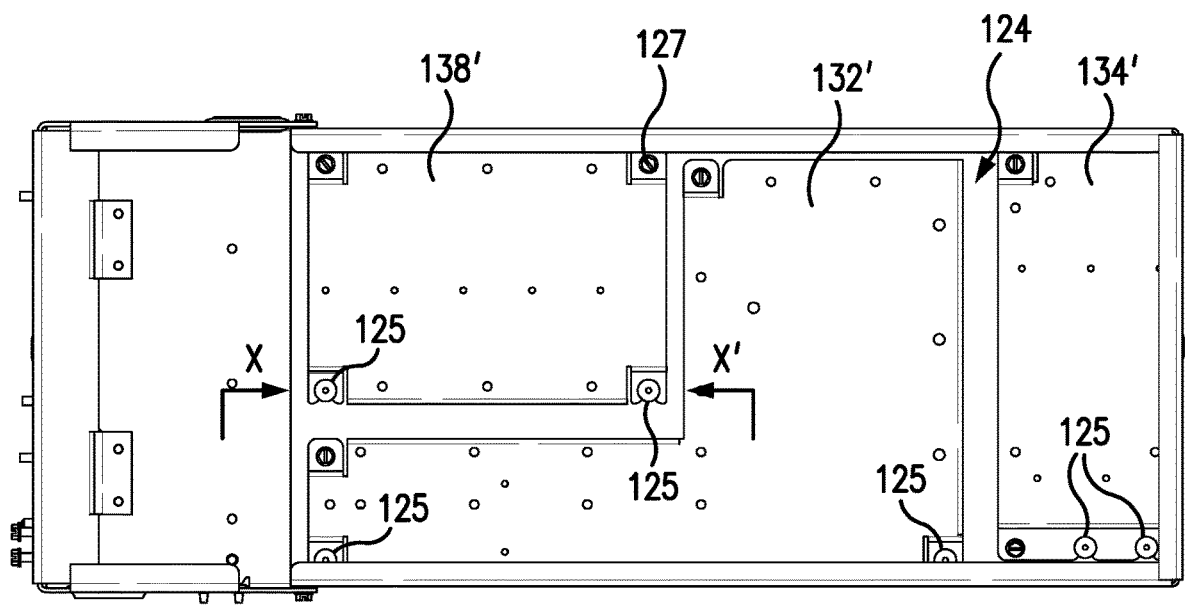
FIG. 5B is a front view of the back panel in the interior space of the modular instrument compartment, showing example positions of the mounting pan platforms that are mounted into place on the shoulder-rivets of FIG. 5A, according to an example embodiment of the disclosure.

FIG. 5B is a front view of the back panel 124 in the interior space 107 of the modular instrument compartment 100, showing example positions of the mounting pan platforms 132', 134', and 138' that are mounted into place on the shoulder-rivets 125 of FIG. 5A, according to an example embodiment of the disclosure.

Figure 6B:
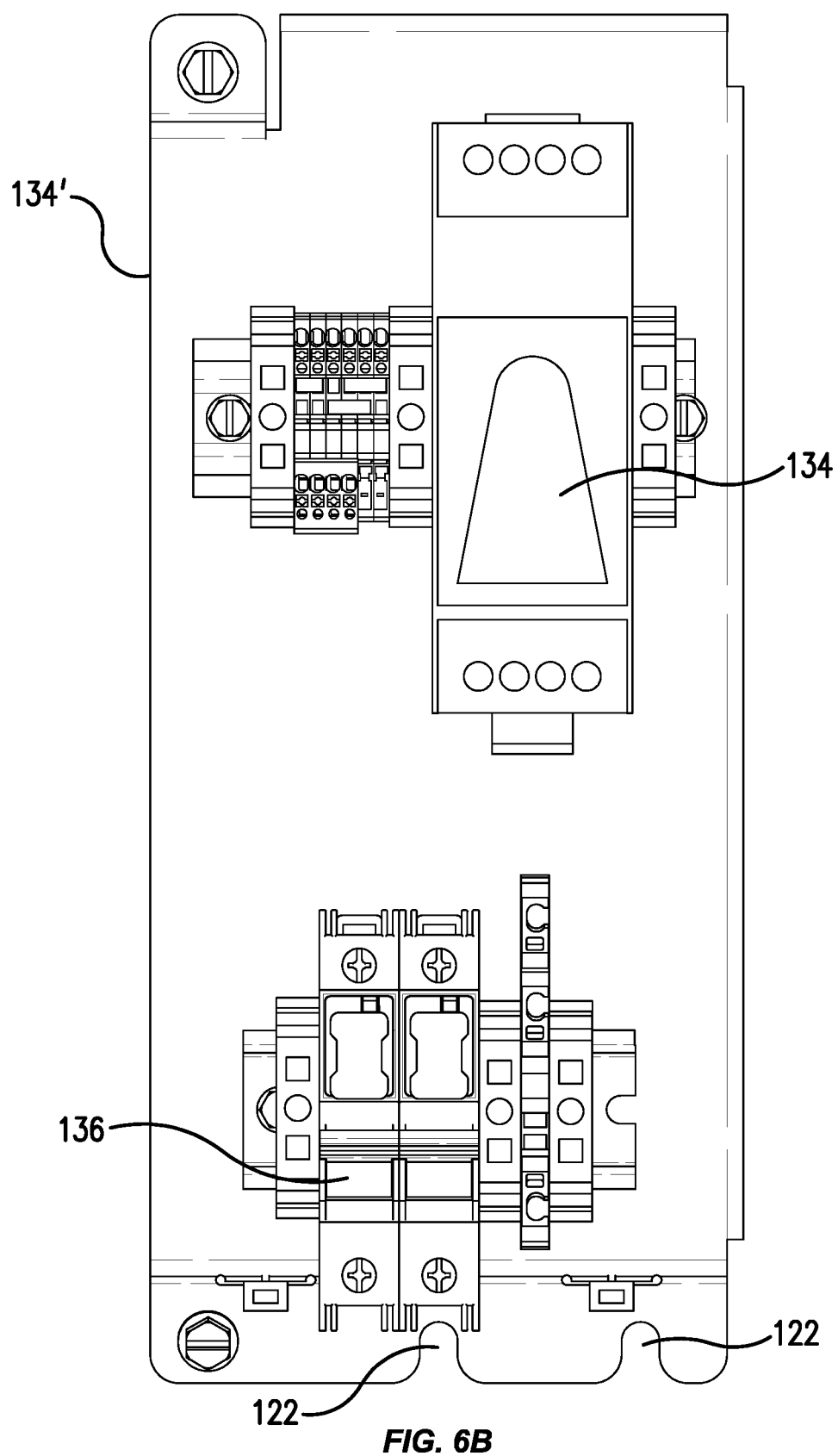
FIG. 6B shows an example of a maintenance mode switch module and mounting pan platform, according to an example embodiment of the disclosure.

A mounting pan platform 132', 134', 138', and/or 140' (FIGS. 5B, 5C, and 5D) is configured to support a respective modular electrical component 130, 132, 134, 136, 138, and/or 140. Each pan platform 132', 134', 138', and/or 140' includes a plurality of holes or slots 122 through the pan platform (FIGS. 5F, 6B, 7B, and 8B) in a pattern matching at least a portion of the pattern of rivet structures 125 mounted on the inside back panel 124 surface of the interior space 107 (FIGS. 5A, 5B, 5C, 5D, and 5F). Example holes 122 may be circular in shape, may be a slot in shape, may be a slot that is open at one end to permit the mounting pan platform to slide transversely onto the rivet structure 125, or may have another shape, such as a polygon. FIG. 5B shows the screw 127 that securely fastens the pan 138' to the inside back panel 124. FIG. 6B shows an example of a power supply 134 mounted on pan 134'. FIG. 7B shows an example of a power meter module 138 mounted on pan 138'. FIG. 8B shows an example of a surge protection device 132 and 3 pole fused disconnect switch 130 module mounted on a pan 132'.

The hole or slot 122 (FIG. 5F) through the pan platform 132', 134', 138', and/or 140' is configured to fit over a corresponding rivet structure 125 mounted on the inside back panel 124 of the interior space 107. The corresponding rivet structures 125 located on the inside back panel 124 of the interior space are configured to position the respective modular electrical component 130, 132, 134, 136, 138, and/or 140 mounted on the pan platform 132', 134', 138', and/or 140' to connect to a plug and play wiring harness (FIGS. 5E, 5F, 5G, 6A, 7A, and 8A) to connect to the power supply terminal 120 and/or other modular electrical components during assembly within the interior space of the compartment structure.

Figure 5C:
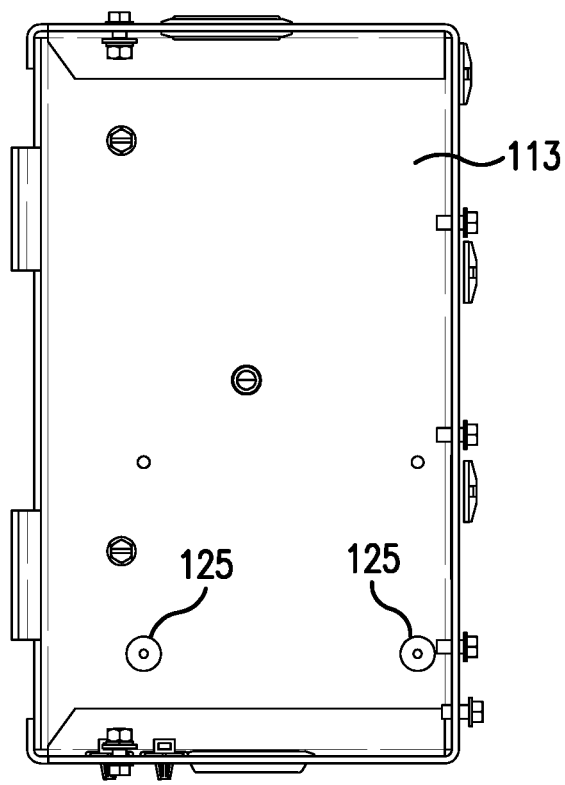
FIG. 5C is a front view of the side panel in the interior space of the modular instrument compartment, showing an example layout of the shoulder-rivets mounted in the side panel, which position the mounting pan platform for the power terminal, which is mounted into place on the shoulder-rivets, according to an example embodiment of the disclosure.

FIG. 5C is a front view of the side panel 113 in the interior space 107 of the modular instrument compartment 100, showing an example layout of the shoulder-rivets 125 mounted in the side panel 113, which position the mounting pan platform 120' for the power terminal 120, which is mounted into place on the shoulder-rivets 125, according to an example embodiment of the disclosure.

Figure 5D:
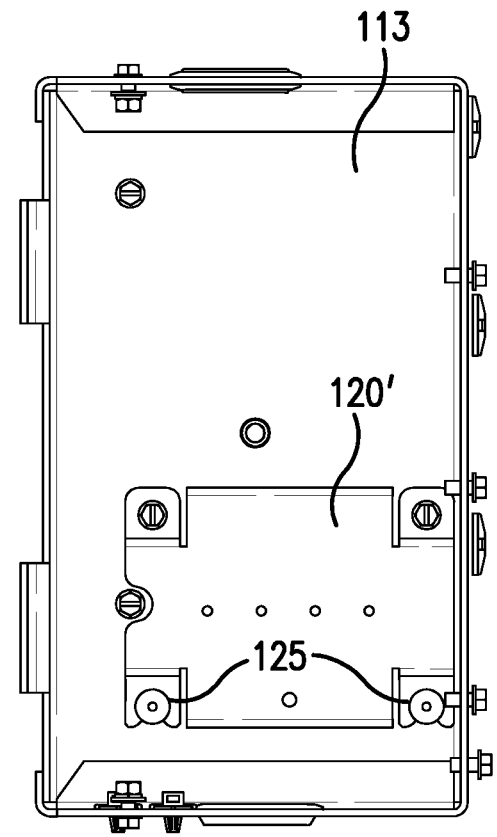
FIG. 5D is a front view of the side panel in the interior space of the modular instrument compartment, showing an example position the mounting pan platform for the power terminal, which is mounted into place on the shoulder-rivets, according to an example embodiment of the disclosure.

FIG. 5D is a front view of the side panel 113 in the interior space 107 of the modular instrument compartment 100, showing an example position the mounting pan platform 120' for the power terminal 120, which is mounted into place on the shoulder-rivets 125, according to an example embodiment of the disclosure.

Figure 5E:
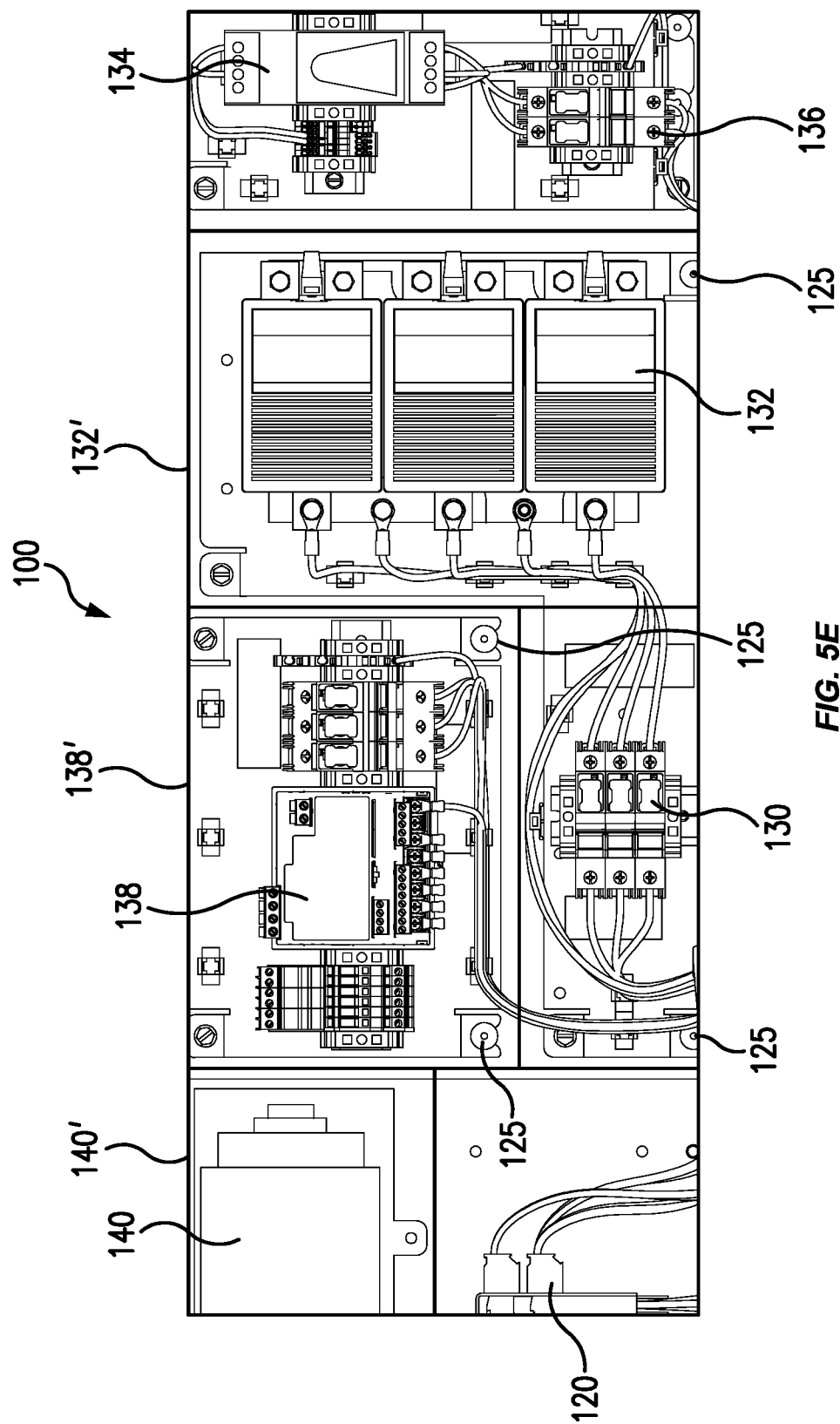
FIG. 5E is a front view of the interior space of the modular instrument compartment, showing example instrument modules that are mounted in position on the mounting pan platforms that are, in turn, mounted into place on the shoulder-rivets, according to an example embodiment of the disclosure.

FIG. 5E is a front view of the interior space 107 of the modular instrument compartment 100, showing example modular electrical components such as power terminal 120, 3 pole fused disconnect switch 130, surge protector 132, power supply 134, fusible disconnect 136, power meter 138, and/or heat tag 140, which are mounted in position on the mounting pan platforms that are, in turn, mounted into place on the shoulder-rivets 125, according to an example embodiment of the disclosure. The power supply 134 supplies power to the maintenance mode lighted switch located on the door, and it supplies power to the main breaker outside of the instrument compartment trip unit, to keep it lighted during a no power situation.

Figure 5F:
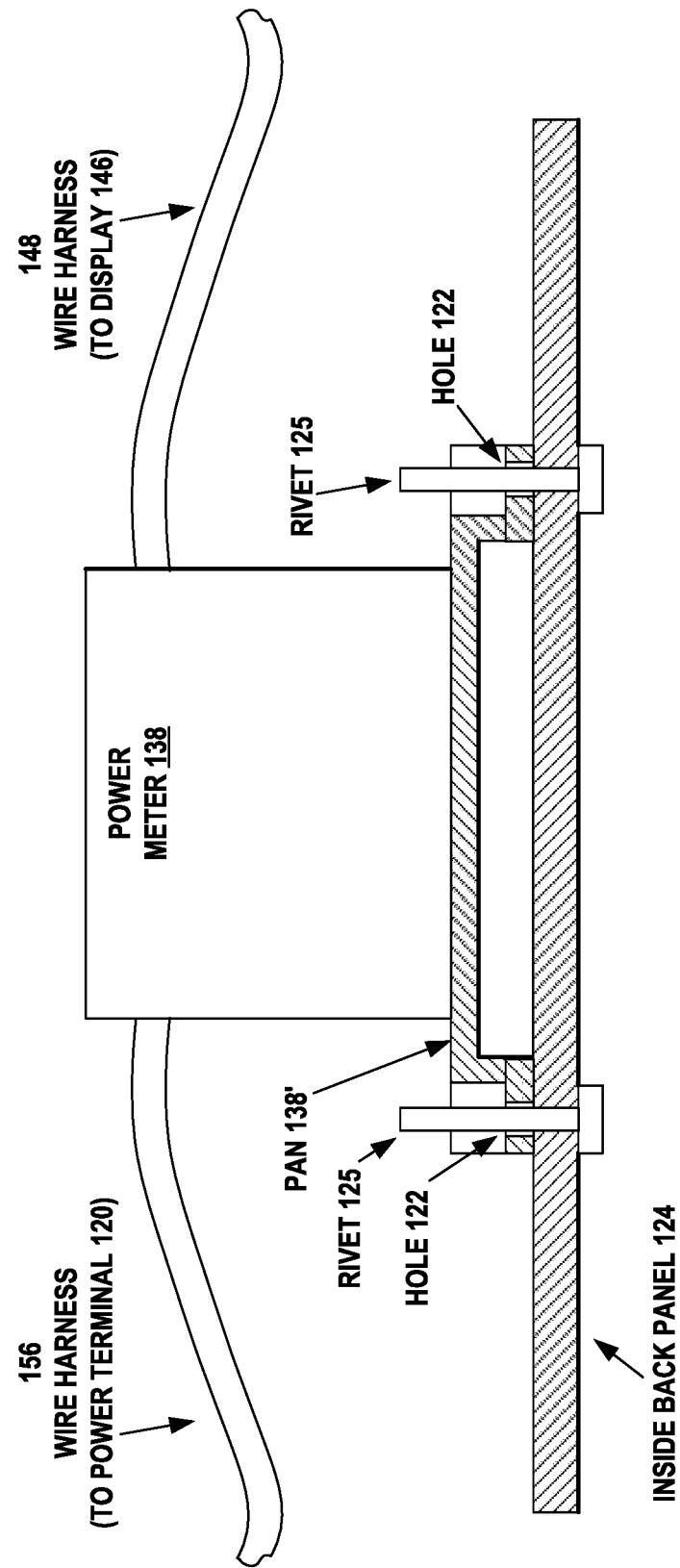
FIG. 5F is a top, cross sectional view along line X-X' of FIG. 5B, showing the mounting pan platform for the power meter instrument module and the hole or slot through the pan platform, which is configured to fit over the corresponding rivet structure mounted on the inside back panel of the interior space of the compartment, the figure showing wire harnesses to connect the power meter module to the power terminal and to the display in the door, according to an example embodiment of the disclosure.

FIG. 5F is a top, cross sectional view along line X-X' of FIG. 5B, showing the mounting pan platform 138' for the power meter instrument module 138 and the holes or slots 122 through the pan platform 138', which are configured to fit over the corresponding rivet structures 125 mounted on the inside back panel 124 of the interior space 107 of the compartment 100. The figure also shows wiring harness 156 to connect the power meter module 138 to the power terminal 120 and wiring harness 148 to connect the power meter module 138 to the display 146 in the door 104, according to an example embodiment of the disclosure.

Figure 5G:
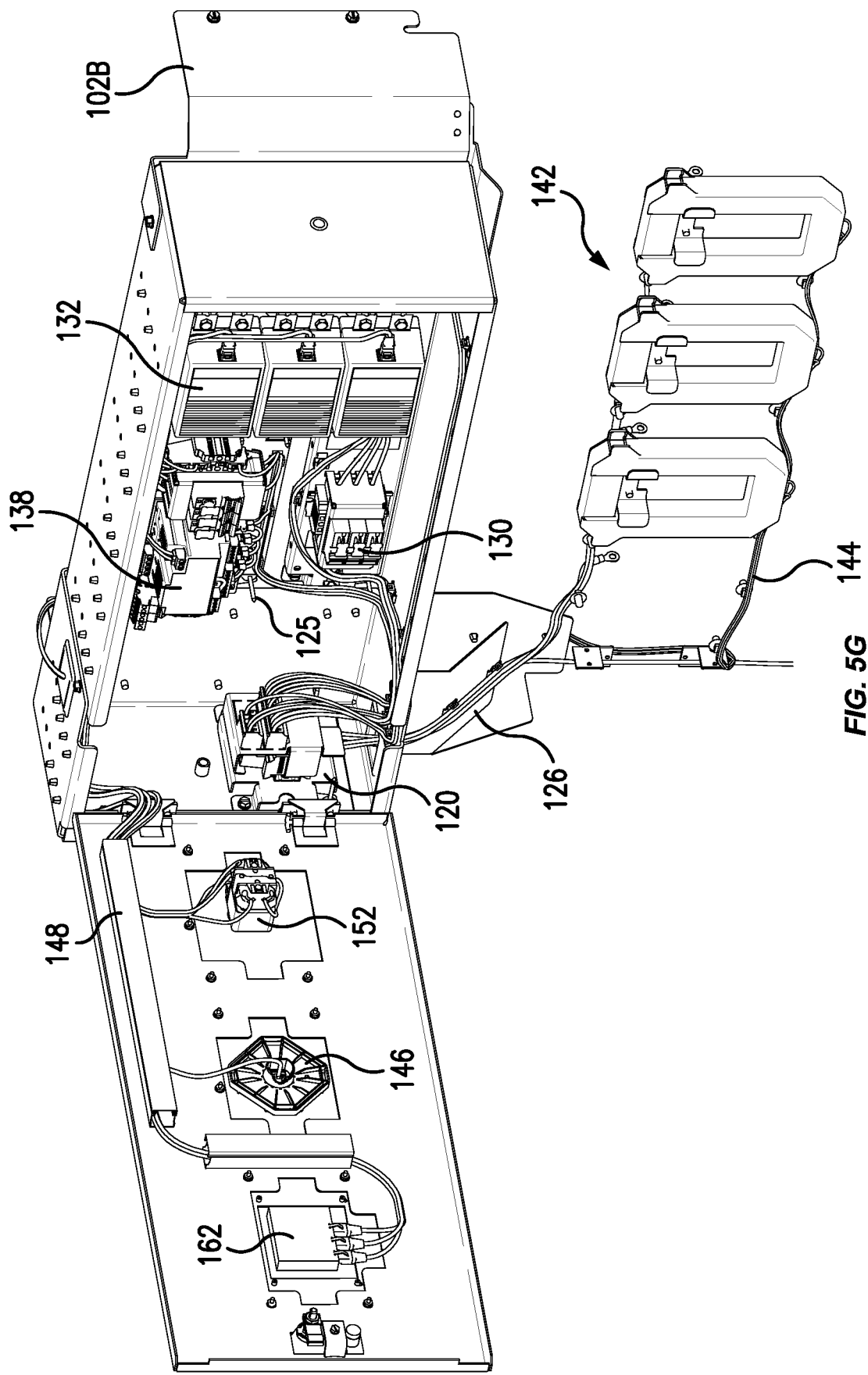
FIG. 5G is a front, right perspective view of the modular instrument compartment with the door open, showing the interior space of the compartment populated by example instrument modules that are mounted in position on the module pans that are, in turn, mounted into place on the shoulder-rivets, with respective instrument modules interconnected by wire harnesses, according to an example embodiment of the disclosure.

FIG. 5G is a front, right perspective view of the modular instrument compartment 100 with the door 104 open, showing the interior space of the compartment populated by example instrument modules 130, 132, and 138 that are mounted in position on the mounting pan platforms that are, in turn, mounted into place on the shoulder-rivets 125. The respective instrument modules 130, 132, and 138 are interconnected by plug and play wiring harnesses, for example wiring harness 144 to the current transformers 142 located in the interior volume 101' of the electrical cabinet 101. During assembly, the swingable portion 118 of the compartment structure 100 is swung out to allow access through the opening 105 in the front surface of the electrical cabinet 101, to enable the assembler to reach into the interior volume 101' located behind the swingable portion 118, for connection of the wiring harness 144 to the current transformers 142, according to an example embodiment of the disclosure.

Figure 6A:
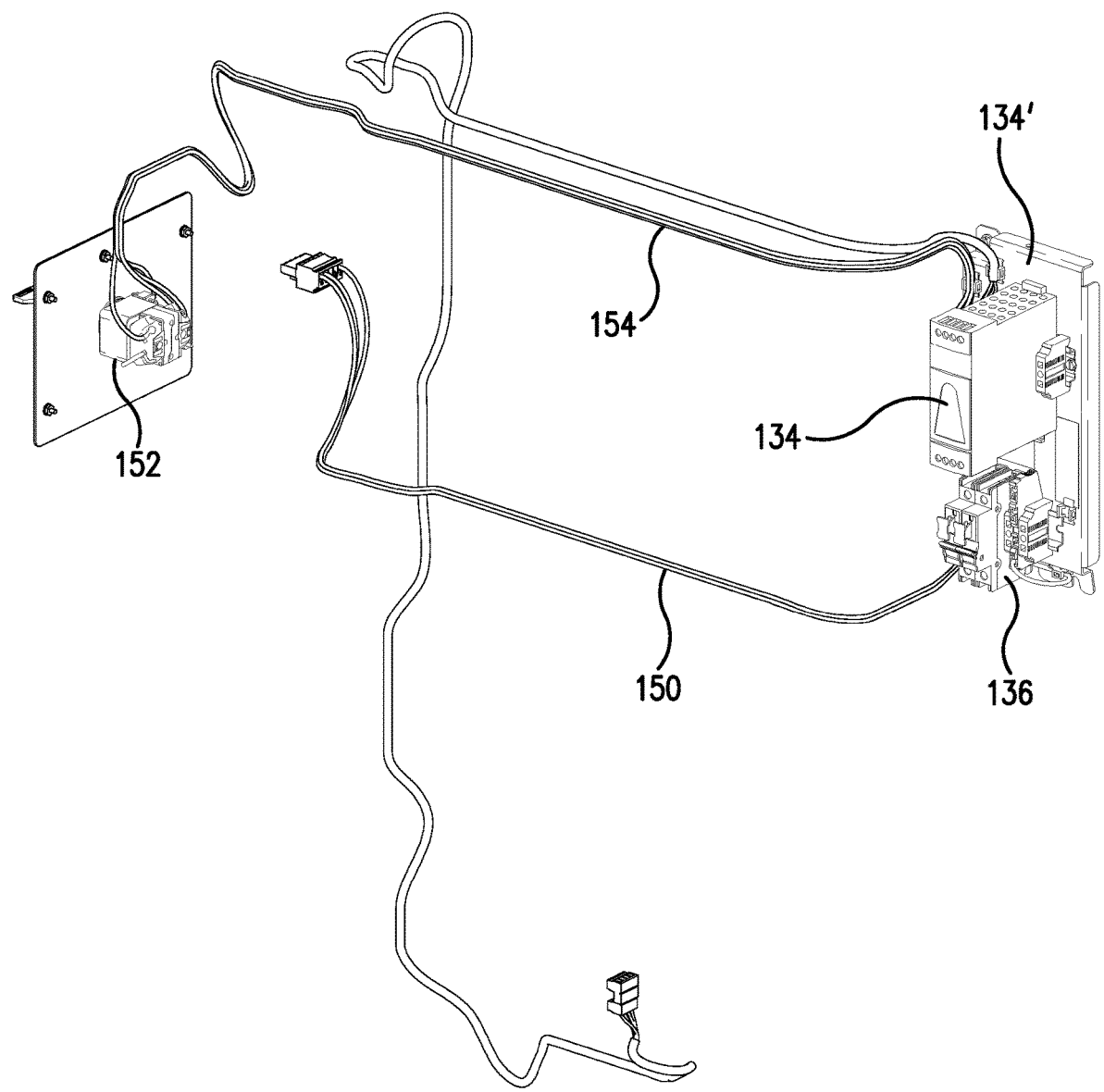
FIG. 6A is a front, right perspective view of an example instrument module that is a maintenance mode switch module that is mounted in position on a mounting pan platform that is, in turn, mounted into place on shoulder-rivets, with the maintenance mode switch module interconnected by wire harnesses to the power terminal module, the lighted switch, and the breaker trip unit, according to an example embodiment of the disclosure.

FIG. 6A is a front, right perspective view of an example instrument module. The fusible disconnect 136 serves to disconnect power from the power supply 134. The power supply 134 supplies 24 VDC to both the lighted maintenance mode switch on the door 104 and to the trip unit display of the main section breaker for low or no power situations. The power supply 134 and the fusible disconnect 136 are mounted in position on a mounting pan platform 134' that is, in turn, mounted into place on shoulder-rivets 125. The power supply 134 is interconnected by plug and play wiring harness 154 to the lighted switch 152 on the door 104. The fusible disconnect 136 is interconnected by plug and play wiring harness 150 to the power terminal 120, according to an example embodiment of the disclosure.

FIG. 6B shows an example of the power supply 134 and fusible disconnect 136 and the mounting pan platform 134' with the holes or slots 122 configured to fit over corresponding rivet structures 125 mounted on the inside back panel 124 of the interior space 107, according to an example embodiment of the disclosure.

Figure 7A:
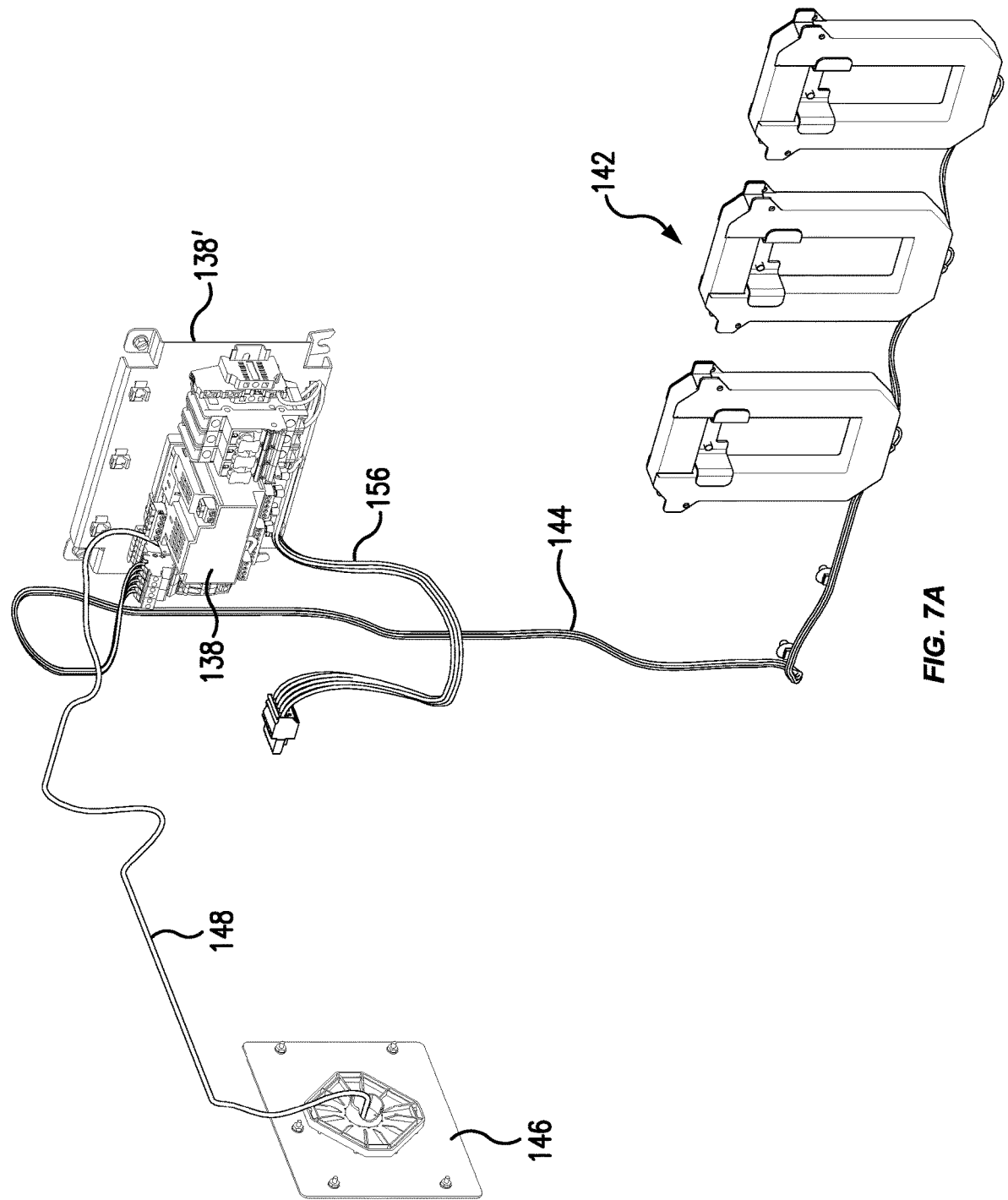
FIG. 7A is a front, right perspective view of an example instrument module that is a power meter module that is mounted in position on a mounting pan platform that is, in turn, mounted into place on shoulder-rivets, with the power meter module interconnected by wire harnesses to the power terminal module, current transformers, and a display, according to an example embodiment of the disclosure.
Figure 7B:
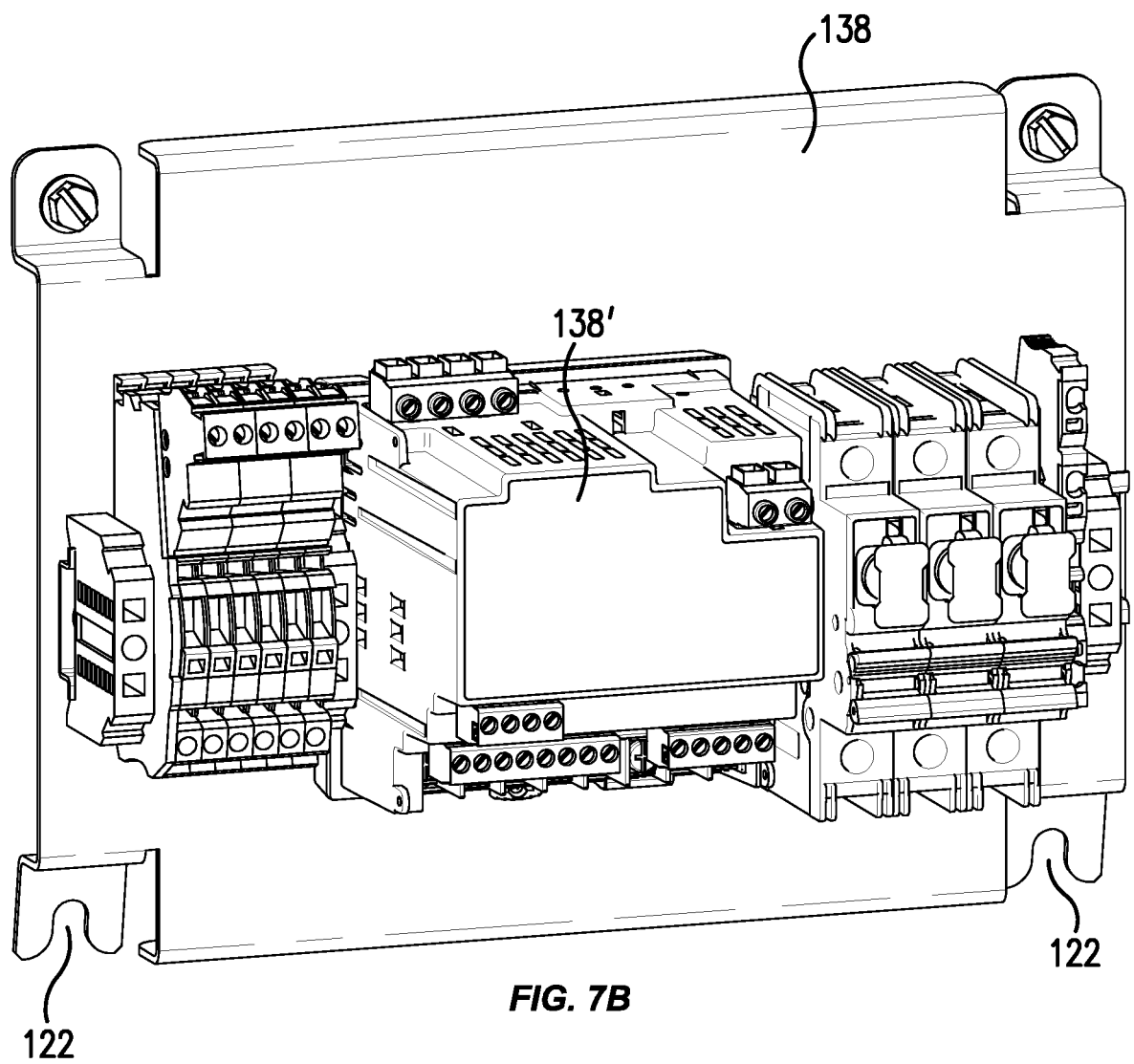
FIG. 7B shows an example of a power meter module and mounting pan platform, according to an example embodiment of the disclosure.

FIG. 7A is a front, right perspective view of an example instrument module, the power meter 138, which is mounted in position on a mounting pan platform 138' that is, in turn, mounted into place on shoulder-rivets 125. The power meter module 138 is interconnected by plug and play wiring harness 156 to the power terminal module 120 and by plug and play wiring harness 148 to display 146 on the door 104. Plug and play wiring harness 144 connects the power meter 138 to current transformers 142, according to an example embodiment of the disclosure.

FIG. 7B shows an example of the power meter module 138 and the mounting pan platform 138' with holes or slots 122 configured to fit over corresponding rivet structures 125 mounted on the inside back panel 124 of the interior space 107, according to an example embodiment of the disclosure.

Figure 8A:
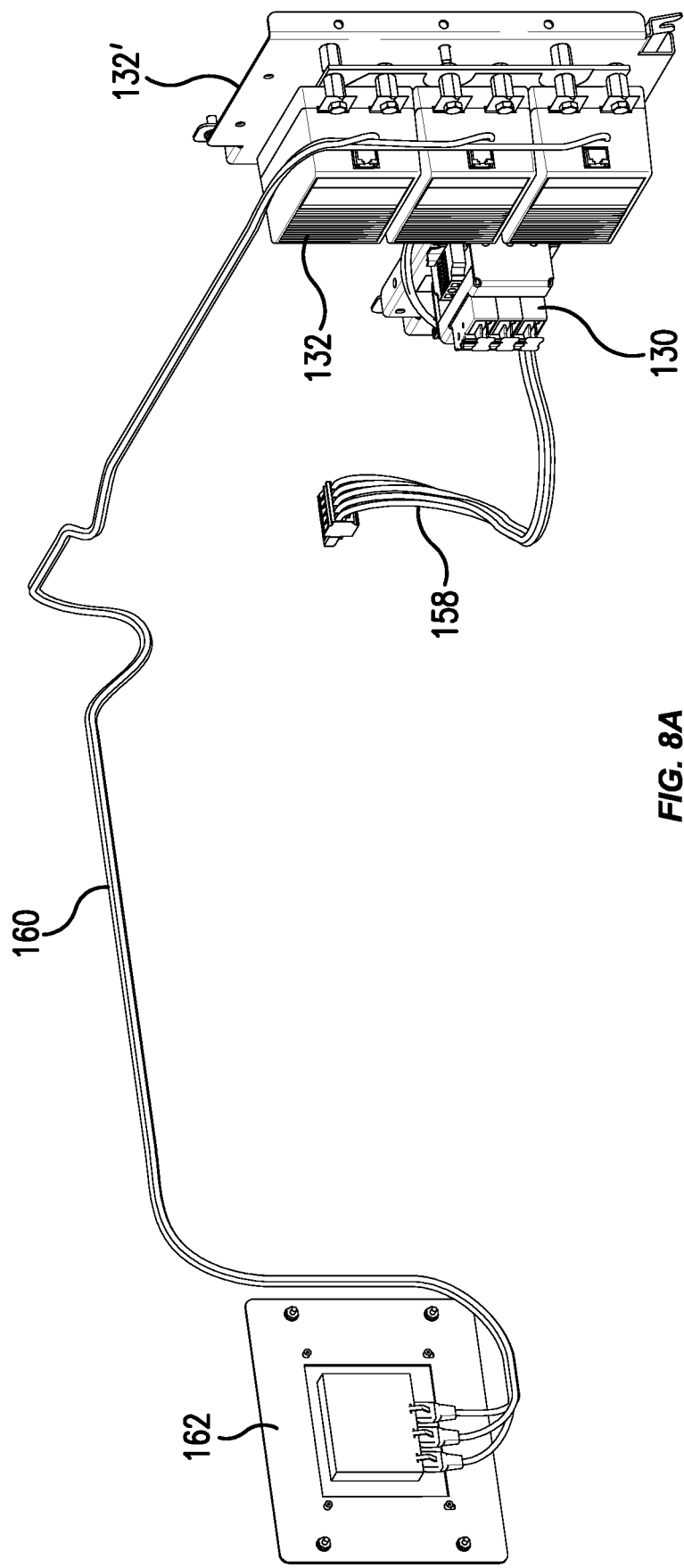
FIG. 8A is a front, right perspective view of an example instrument module that is a surge protection device and circuit breaker module that is mounted in position on a mounting pan platform that is, in turn, mounted into place on shoulder-rivets, with the surge protection device and circuit breaker module interconnected by wire harnesses to the power terminal module and a display, according to an example embodiment of the disclosure.
Figure 8B:
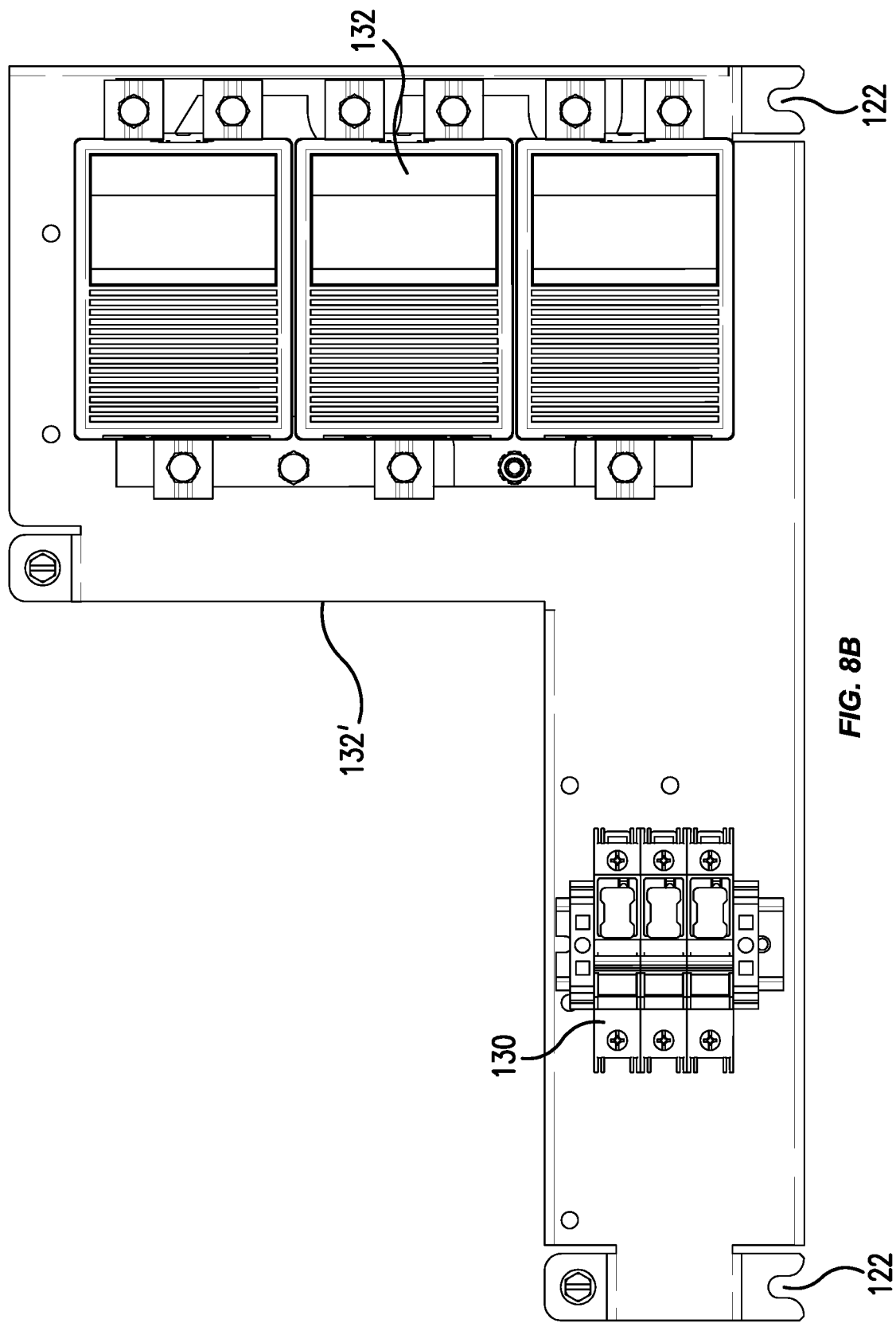
FIG. 8B shows an example of a surge protection device and over current protection device such as a fused disconnect switch or a circuit breaker module and mounting pan platform, according to an example embodiment of the disclosure.

FIG. 8A is a front, right perspective view of an example instrument module, the surge protection device 132 and a fusible switch 130, which are mounted in position on the mounting pan platform 132' that is, in turn, mounted into place on shoulder-rivets 125. The surge protection device 132 is interconnected by wire harness 160 to the display 162 in the door 104. The 3 pole fused disconnect switch 130 is interconnected by wire harness 158 to the power terminal 120, according to an example embodiment of the disclosure.

FIG. 8B shows an example of a surge protection device 132 and 3 pole fused disconnect switch 130 and the mounting pan platform 132' with holes or slots 122 configured to fit over corresponding rivet structures 125 mounted on the inside back panel 124 of the interior space 107, according to an example embodiment of the disclosure.

In an example embodiment, the compartment structure 100 may include a hardware package prepared at the manufacturer that specifically contains the correct number, diameter, length, thread pitch and gauge of hardware required for assembly. A matrix or 2D barcode nay be attached to the compartment structure 100 in a position that provides access to information describing each component of the compartment structure 100, the proper steps for assembly, the type of hardware, its location in the assembly, and any special tools required for assembling the compartment structure 100. Augmented reality may also be used to show the assembler, in an approved and certified sequence, where each component of the compartment structure 100 is to be installed.

The resulting apparatus provides an instrument compartment of an electrical cabinet, which will provide fast, easy, error free installation of components in the instrument cabinet by lower skilled labor, without electrical testing.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "component", "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus.

Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An instrument compartment for an electrical cabinet, comprising:
    a box-shaped compartment structure comprising a stationary end portion mounted on a frame of an electrical cabinet, and a swingable portion hinge-mounted to the stationary end portion, the box-shaped compartment structure having an open front-side facing a front side of the electrical cabinet, the swingable portion configured to swing out from the front side of the electrical cabinet to enable access through the front side of the electrical cabinet to an interior volume of the electrical cabinet located behind the swingable portion of the compartment structure;
    guide structures mounted on an inside back panel of an interior space within the compartment structure, configured to position at least one modular electrical component for connection by at least one wiring harness to another modular electrical component during assembly within the interior space of the compartment structure, wherein the guide structures include a plurality of rivet structures mounted in a pattern on the inside back panel of the interior space within the compartment structure, each rivet structure of the plurality of rivet structures projecting out of the inside back panel of the interior space; and
    at least one pan platform configured to support the at least one modular electrical component, the at least one pan platform including a plurality of holes or slots through the pan platform in a pattern matching at least a portion of the pattern of rivet structures mounted on the inside back panel of the interior space;

wherein at least one hole or slot of the plurality of holes or slots through the pan platform is configured to fit over a corresponding one of the plurality of rivet structures mounted on the inside back panel of the interior space; and wherein the corresponding one of the plurality of rivet structures is located on the inside back panel of the interior space to position the at least one modular electrical component mounted on the at least one pan platform to connect to the at least one wiring harness to another modular electrical component during assembly within the interior space of the compartment structure.

2. The instrument compartment for an electrical cabinet of claim 1, wherein the at least one modular electrical component is a power meter, a maintenance mode switch, a 24 VDC power control, a surge protection device, a wireless metering device, a wiring over-heating protection device, a gateway, or an absence of voltage tester.

3. The instrument compartment for an electrical cabinet of claim 1, wherein the swingable portion of the compartment structure is configured to be swung away from the front side of the electrical cabinet to allow access through the front side of the electrical cabinet during an assembly operation, to enable an assembler to reach into the interior volume located behind the swingable portion, for connection of a wiring harness to electrical components in the interior volume.

4. The instrument compartment for an electrical cabinet of claim 1, further comprising:

a door hinge-mounted to the stationary end portion of the compartment structure and covering the open front-side, configured to swing away from the open front-side to enable access through the open front-side to the interior space within the compartment structure; and a power supply terminal mounted to an inside surface of the stationary end portion of the compartment structure, configured to supply electrical power to at least one modular electrical component in the interior space of the compartment structure.

5. The instrument compartment for an electrical cabinet of claim 1, further comprising:

guide structures mounted on an inside side panel of the interior space within the compartment structure, configured to position a power supply terminal for connection to the at least one wiring harness during assembly within the interior space of the compartment structure, wherein the guide structures mounted on the inside side panel of the interior space within the compartment structure include a plurality of rivet structures mounted in a pattern on the inside side panel of the interior space within the compartment structure, each rivet structure of the plurality of rivet structures on the inside side panel projecting out of the inside side panel of the interior space; and a side pan platform configured to support the power supply terminal, the side pan platform including a plurality of holes or slots through the side pan platform in a pattern matching at least a portion of the pattern of rivet structures mounted on the inside side panel of the interior space;

wherein at least one hole or slot of the plurality of holes or slots through the side pan platform is configured to fit over a corresponding one of the plurality of rivet structures mounted on the inside side panel of the interior space; and wherein the corresponding one of the plurality of rivet structures mounted on the inside side panel of the interior space is located on the inside side panel of the interior space to position the power supply terminal mounted on the side pan platform to connect to the at least one wiring harness during assembly within the interior space of the compartment structure.

6. An instrument compartment for an electrical cabinet, comprising:

a box-shaped compartment structure comprising a stationary end portion mounted on a frame of an electrical cabinet, and a swingable portion hinge-mounted to the stationary end portion, the box-shaped compartment structure having an open front-side facing a front side of the electrical cabinet, the swingable portion configured to swing out from the front side of the electrical cabinet to enable access through the front side of the electrical cabinet to an interior volume of the electrical cabinet located behind the swingable portion of the compartment structure;

guide structures mounted on an inside back panel of an interior space within the compartment structure, configured to position at least one modular electrical component for connection by at least one wiring harness to another modular electrical component during assembly within the interior space of the compartment structure;

a door hinge-mounted to the stationary end portion of the compartment structure and covering the open front-side, configured to swing away from the open front-side to enable access through the open front-side to the interior space within the compartment structure; and a power supply terminal mounted to an inside surface of the stationary end portion of the compartment structure, configured to supply electrical power to at least one modular electrical component in the interior space of the compartment structure.

7. The instrument compartment for an electrical cabinet of claim 6, wherein the door includes mounting holes for user interface devices that are connected by at least one wiring harness to other modular electrical components during assembly within the interior space of the compartment structure.

8. The instrument compartment for an electrical cabinet of claim 6, wherein the door includes a latch that secures the door in its closed position covering the open front-side of the compartment structure.

9. An instrument compartment for an electrical cabinet, comprising:

a box-shaped compartment structure comprising a stationary end portion mounted on a frame of an electrical cabinet, and a swingable portion hinge-mounted to the stationary end portion, the box-shaped compartment structure having an open front-side facing a front side of the electrical cabinet, the swingable portion configured to swing out from the front side of the electrical cabinet to enable access through the front side of the electrical cabinet to an interior volume of the electrical cabinet located behind the swingable portion of the compartment structure;

guide structures mounted on an inside back panel of an interior space within the compartment structure, configured to position at least one modular electrical component for connection by at least one wiring harness to another modular electrical component during assembly within the interior space of the compartment structure, wherein the guide structures include a plurality of rivet structures mounted in a pattern on an inside side panel of the interior space within the compartment structure, each rivet structure of the plurality of rivet structures on the inside side panel projecting out of the inside side panel of the interior space; and a side pan platform configured to support a power supply terminal, the side pan platform including a plurality of holes or slots through the side pan platform in a pattern matching at least a portion of the pattern of rivet structures mounted on the inside side panel of the interior space;

wherein at least one hole or slot of the plurality of holes or slots through the side pan platform is configured to fit over a corresponding one of the plurality of rivet structures mounted on the inside side panel of the interior space; and wherein the corresponding one of the plurality of rivet structures is located on the inside side panel of the interior space to position the power supply terminal mounted on the side pan platform to connect to the at least one wiring harness during assembly within the interior space of the compartment structure.

10. An instrument compartment for an electrical cabinet, comprising:

a box-shaped compartment structure comprising a stationary end portion mounted on a frame of an electrical cabinet, and a swingable portion hinge-mounted to the stationary end portion, the box-shaped compartment structure having an open front-side facing a front side of the electrical cabinet, the swingable portion configured to swing out from the front side of the electrical cabinet to enable access through the front side of the electrical cabinet to an interior volume of the electrical cabinet located behind the swingable portion of the compartment structure;

guide structures mounted on an inside back panel of an interior space within the compartment structure, configured to position at least one modular electrical component for connection by at least one plug-and-play wiring harness to another modular electrical component during assembly within the interior space of the compartment structure, wherein the guide structures include a plurality of rivet structures mounted in a pattern on the inside back panel of the interior space within the compartment structure, each rivet structure of the plurality of rivet structures projecting out of the inside back panel of the interior space; and at least one pan platform configured to support the at least one modular electrical component, the at least one pan platform including a plurality of holes or slots through the pan platform in a pattern matching at least a portion of the pattern of rivet structures mounted on the inside back panel of the interior space;

wherein at least one hole or slot of the plurality of holes or slots through the pan platform is configured to fit over a corresponding one of the plurality of rivet structures mounted on the inside back panel of the interior space; and wherein the corresponding one of the plurality of rivet structures is located on the inside back panel of the interior space to position the at least one modular electrical component mounted on the at least one pan platform to connect to the at least one plug-and-play wiring harness to another modular electrical component during assembly within the interior space of the compartment structure.

11. The instrument compartment for an electrical cabinet of claim 10, further comprising:

a door hinge-mounted to the stationary end portion of the compartment structure and covering the open front-side, configured to swing away from the open front-side to enable access through the open front-side to the interior space within the compartment structure; and a power supply terminal mounted to an inside surface of the stationary end portion of the compartment structure, configured to supply electrical power to at least one modular electrical component in the interior space of the compartment structure, by means of the at least one plug-and-play wiring harness.

12. The instrument compartment for an electrical cabinet of claim 10, further comprising:

guide structures mounted on an inside side panel of the interior space within the compartment structure, configured to position a power supply terminal for connection to the at least one wiring harness during assembly within the interior space of the compartment structure, wherein the guide structures mounted on the inside side panel of the interior space within the compartment structure include a plurality of rivet structures mounted in a pattern on an inside side panel of the interior space within the compartment structure, each rivet structure of the plurality of rivet structures on the inside side panel projecting out of the inside side panel of the interior space; and a side pan platform configured to support the power supply terminal, the side pan platform including a plurality of holes or slots through the side pan platform in a pattern matching at least a portion of the pattern of rivet structures mounted on the inside side panel of the interior space;

wherein at least one hole or slot of the plurality of holes or slots through the side pan platform is configured to fit over a corresponding one of the plurality of rivet structures mounted on the inside side panel of the interior space; and wherein the corresponding one of the plurality of rivet structures mounted on the inside side panel of the interior space is located on the inside side panel of the interior space to position the power supply terminal mounted on the side pan platform to connect to the at least one plug-and-play wiring harness during assembly within the interior space of the compartment structure.

13. The instrument compartment for an electrical cabinet of claim 10, wherein the at least one modular electrical component is a power or energy meter, arc energy reduction device, power controls device, communications device, automation and controls device, surge protection device, wiring over-heating protection device, a gateway device or an absence of voltage tester device.

14. The instrument compartment for an electrical cabinet of claim 10, wherein the swingable portion of the compartment structure is configured to be swung away from the front side of the electrical cabinet to allow access through the front side of the electrical cabinet during an assembly operation, to enable an assembler to reach into the interior volume located behind the swingable portion, for connection of the at least one plug-and-play wiring harness to electrical components in the interior volume.

15. The instrument compartment for an electrical cabinet of claim 11, wherein the door includes mounting holes for user interface devices that are connected by the at least one plug-and-play wiring harness to other modular electrical components during assembly within the interior space of the compartment structure.

16. The instrument compartment for an electrical cabinet of claim 11, wherein the door includes a latch that secures the door in its closed position covering the open front-side of the compartment structure.

17. An instrument compartment for an electrical cabinet, the instrument compartment comprising:
a compartment structure having a box-shape, the compartment structure comprising a stationary end portion mounted on a frame of an electrical cabinet, and a swingable portion hinge-mounted to the stationary end portion, each of the stationary end portion and the swingable portion contributing to form the box-shape of the compartment structure, the box-shaped compartment structure having an open front-side facing a front side of the electrical cabinet, the swingable portion configured to swing out from the front side of the electrical cabinet to enable access through the front side of the electrical cabinet to an interior volume of the electrical cabinet located behind the swingable portion of the compartment structure.

18. The instrument compartment for an electrical cabinet of claim 17, the instrument compartment further comprising:
guide structures mounted on at least one of an inside back panel or an inside side panel of an interior space within the compartment structure, the guide structures configured to position at least one modular electrical component or a power supply terminal within the interior space of the compartment structure.

19. The instrument compartment for an electrical cabinet of claim 18, wherein the guide structures comprise rivet structures mounted on the at least one of the inside back panel or the inside side panel of the interior space within the compartment structure, each rivet structure projecting out of the at least one of the inside back panel or the inside side panel of the interior space.

20. The instrument compartment for an electrical cabinet of claim 17, the instrument compartment further comprising:
a door hinge-mounted to the stationary end portion of the compartment structure and covering the open front-side, configured to swing away from the open front-side to enable access through the open front-side to the interior space within the compartment structure.

* * * * *